Patented Sept. 6, 1932

1,875,944

UNITED STATES PATENT OFFICE

JAGAN N. SHARMA, OF BERKELEY, CALIFORNIA, ASSIGNOR TO FOOD MACHINERY CORPORATION, OF SAN JOSE, CALIFORNIA, A CORPORATION OF DELAWARE

PROCESS OF TREATING FRUIT TO REMOVE SPRAY RESIDUES

No Drawing. Application filed June 9, 1931. Serial No. 543,133.

This invention relates to a process of treating fruit to remove spray residues, and particularly refers to a process of removing lead arsenate from fruit, particularly from apples or other deciduous fruits.

One of the most common sprays used to control fruit diseases and scales is lead arsenate, and this material is highly poisonous to humans, so that it must be removed before the fruit is placed on the market. Heretofore, hydrochloric acid solutions have generally been used for removing the lead arsenate. Usually hydrochloric acid is used in about 2% solutions at a temperature of about 120° F. This hydrochloric acid is very corrosive on the machinery in which the washing is effected, being highly deterimental to the metal parts and, consequently, the machinery rapidly wears out. It is also detrimental to the brushes in the machinery. Furthermore, it has been found that very great care must be taken in washing the fruit in hydrochloric acid, since if the fruit is left in the solution too long it discolors the interior of the fruit. For example, it will turn the meaty portion of apples black.

It has lately been discovered that the efficiency of lead arsenate as a control for fruit diseases is greatly increased if it is mixed with an oily base, which in some cases is mineral oil and in other cases an animal oil, such as fish oil. The mode of application of the arsenate and oil compound varies. In some cases, the oil is mixed with the lead arsenate and the resulting mixture sprayed directly on the fruit. In other cases, the lead arsenate is sprayed onto the fruit first and the oil sprayed on the fruit afterward. In some cases, this process is repeated several times, thus resulting in several overlying coatings on the fruit.

It has been found that while hydrochloric acid will successfully remove lead arsenate in some cases, in other cases it will not go through the oil used in the spray with sufficient efficiency to remove the lead arsenate beneath. Moreover, deciduous fruits, such as apples, continuously exude a natural wax and this wax has a property of coating the lead arsenate residues on the skin of the fruit, and when the fruit is sprayed several times with lead arsenate compound. The application of hydrochloric acid does not properly remove the lead arsenate, because it is unable to properly remove the wax and oil on the fruit in order to come in contact with the lead arsenate residues.

The present invention embodies the discovery that solutions of water glass or sodium silicate have the property of cutting through the oil and wax on the fruit with ease and can remove both the oil and wax from the fruit and the lead arsenate residues with greater facility. Sodium silicate ($Na_2SiO_3$) will react with lead arsenate ($PbHAsO_4$) to form oxy-triarsenate, which is soluble in the solution and thus is removed from the fruit.

It has been further found that a solution of sodium silicate not only may cut through the waxes and oils on the fruit and remove lead arsenate compounds efficiently, but these solutions may be used in low concentrations and at low temperatures, if desired, and are not detrimental to the machinery or the brushes used in the washing operations.

The present invention will best be understood from a description of a preferred form or example of a process of treating fruit embodying the invention. For this purpose, I have hereinafter described a preferred form or example of the invention.

As a fruit to be treated, I have found that any fruit which has been subjected to a lead arsenate spray may be used, although the process is particularly useful in removing lead arsenate from apples. The solution of sodium silicate may, if desired, be applied cold, although it may also be applied in the heated condition at temperatures of, say 120° F. I have not found any particular advantage in heating the solution. The solution may be used in various strengths, but I have found satisfactory results with the use of 2% solution.

The solution may be applied to the fruit in various manners, such as by spraying the solution on to the fruit, but I preferably submerge the fruit in a tank of the solution. The time during which the fruit is subjected to the action of the solution will vary with the amount of arsenate on the fruit and character of the residue, i. e., whether it contains oil or wax. I have generally found, however, that by maintaining the fruit in the solution about one-half minute the lead arsenate residue is sufficiently removed.

The sodium silicate solution has the advantage that it has a high degree of efficiency at low temperatures that it is non-corrosive and, therefore, not detrimental to the machinery; and that it will remove oil as well as lead arsenate residues from the fruit.

It has also been found that by treating fruit, such as apples, with a solution of sodium silicate not only is the deposit of lead arsenate removed from the fruit, but, at the same time, the excess wax and oil on the fruit is removed, with the result that the treated fruit may attain a higher polish.

While the particular process herein described is well adapted to carry out the objects of the invention, it is to be understood that various modifications may be made and the substitution of equivalent silicates may, in some cases, be employed, and this invention is not limited, therefore, to the particular form of the process described for illustrating the same.

I claim:

1. A process of treating fruit to remove spray residues, including arsenates, which comprises contacting the fruit with a solution of alkali silicate.

2. A process of treating fruit for the removal of spray residues, such as lead arsenate deposits, which comprises contacting the fruit with a solution of sodium silicate.

3. A process of treating deciduous fruits for the removal of lead arsenate residues, which comprises contacting the fruit with a cold dilute solution of sodium silicate.

4. A process of treating fruit, such as apples, to remove spray residues, such as lead arsenate compounds, which comprises contacting the fruit with a solution of alkali silicate capable of forming oxy-triarsenate with the lead arsenate of the residue.

5. A process of removing lead arsenate compounds from fruit, such as apples, which comprises contacting the fruit with an alkaline solution which forms oxy-triarsenate with the lead arsenate of the fruit.

Signed at Los Angeles, Cal., this 23rd day of May, 1931.

JAGAN N. SHARMA.